Patented Aug. 27, 1929.

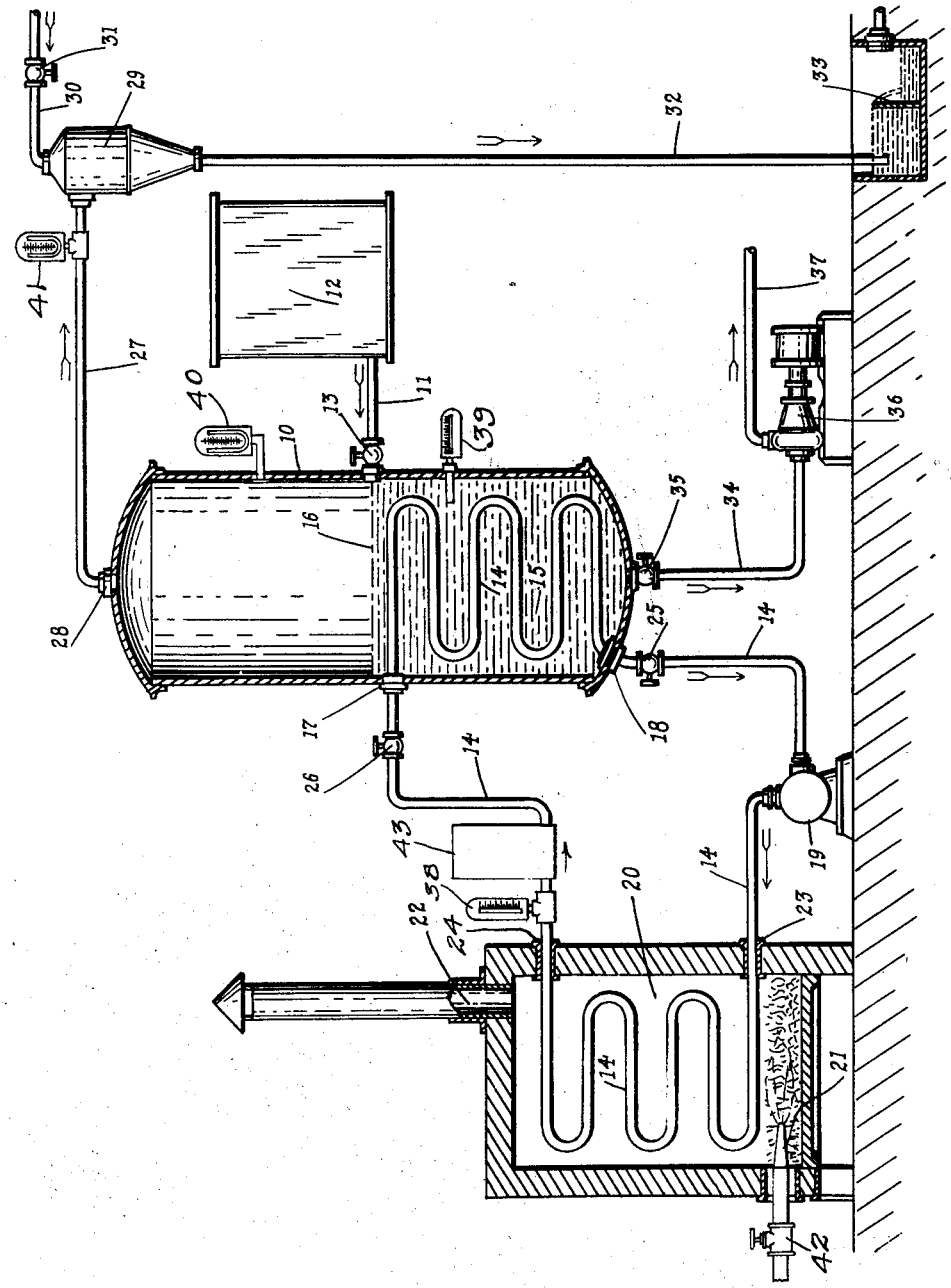

1,726,321

UNITED STATES PATENT OFFICE.

WALTER HOWARD SIMONSON, OF BROOKLYN, AND OTTO MANTIUS, OF NEW YORK, N. Y.

PROCESS FOR CONCENTRATING SULPHURIC ACID.

Application filed June 8, 1923. Serial No. 644,135.

The production of sulphuric acid is one of the most important manufactures in the chemical arts, and, of the various steps involved, its concentration is of the greatest consequence.

Although in some applications and uses of sulphuric acid a diluted body is satisfactory, a concentrated form is absolutely necessary in many of the arts: such for instance as the preparation of high explosives.

It is also especially employed for bringing ordinary dilute $H_2SO_4$ up to any higher required strength: this is a widely employed use in the arts.

Perhaps the most widely used commercial method of manufacturing sulphuric acid is by means of the chamber process. This process has the limitation of being unable to produce acid over 60° Bé. in strength, and to bring the acid to the commercial grade of 66° Bé. some means of further concentrating or de-hydrating the acid must be provided. It is principally to concentrate chamber acid of lower specific gravity that our process is used.

There have been numerous attempts both here and abroad to provide a system and apparatus which satisfies and discharges all of the requirements imposed. None of these however have been selected or approved by the trade as a solution of the problems confronted and none have been universally adopted as being the final solution of the problem.

The concentration by means of lead pans heated either from the top or bottom is well known, but the losses inconvenience and lack of efficiency have not provided general satisfaction. Such pans have also been heated by steam pipes positioned along the bottom of the pan on the inside and although such an arrangement presents certain advantages over the direct heating system it obviously still possessed the drawbacks of treating the acid in pans.

Lead lined apparatus hitherto employed cannot be used to concentrate sulphuric acid above 60° Bé. since lead is soluble in hot sulphuric acid of that concentration nor can steam in lead coils be used as the heating medium for the acid, as has also been suggested, where the concentration is over 60° Bé. since the temperature of the steam would not be high enough to cause boiling of the acid under such conditions unless the steam were at a pressure which would disrupt the lead pipe. Such apparatus is therefore impractical for concentrating sulphuric acid from 56° Bé. to 66° Bé. as is done by the process of the present inventors.

Towers filled with pebbles or other materials and heated directly by hot gases have also been employed but with varying success and for high concentrations apparatus composed either of glass or platinum retorts have been used; but the glass apparatus has the drawback of very restricted size and great liability of breaking and platinum of being very costly.

Another plan has had extensive use, namely, that employing porcelain dishes. Many plants were erected and operated on this plan but they were all finally abandoned, or partially dismantled, and replaced by cast iron vessels.

Still another system suggested embodied an evaporating chamber heated exteriorly by oil at a high temperature. Such a plant would be operated at a disadvantage in several ways; in the first place from an economical standpoint the vast quantity of oil which it would be necessary to employ to surround the evaporating chamber would render it commercially unavailable: no proper method of heating and maintaining the temperature of the oil was advanced and for this reason as well as from the standpoint of efficiency it was not successful: it has also been suggested combining such an arrangement with a perforated pipe for conveying hot air into the acid and at the same time endeavoring to create a partial vacuum in the evaporator; such a system and arrangement is of course, absurd as a constant feeding of hot air into the acid would so disturb and impair the attempt to create and maintain a vacuum as to stultify all efforts in this direction.

It is one of the objects of our process and invention to maintain a high vacuum by providing means for condensing and eliminating the created vapors and for materially lowering the boiling point of the acid without disturbing the vacuum. The degree of vacuum is sufficiently indicated by the data given herein as to the degree of concentration and the approximate temperature of the acid.

The foregoing examples constitute only a small percentage of the mainfold forms of systems and apparatus employed to arrive at a commercially successful process of sulphuric acid concentration.

The drawbacks and difficulties attending these various methods and instrumentalities have been pointed out. In each and every one some necessary phase was left unprovided for; some essential unguarded. A proper process in its entirety has never been engineered and owing to the incompleteness of every attempt heretofore made, a collapse, or a partial collapse has resulted.

For these reasons we have reviewed these attempts with some particularity in order to present in a proper manner the various means and methods heretofore employed, and to finally point out that no previous system has been worked out possessing all of the necessary attributes to achieve commercial success.

The object of our invention is to provide a completely engineered plan whereby a continuous process may be carried on with the least possible loss and with the greatest possible efficiency.

In carrying our invention into effect we employ what we term a closed system; that is to say the evaporator employed is an enclosed chamber and co-operating with this is an apparatus providing means for a circulating heating medium which is also entirely enclosed.

We employ as the heating medium, particularly in producing the very high condensations referred to, a fluid capable of having a high temperature at reduced pressure as compared with steam, and preferably a liquid, as oil, having a higher boiling point than water. This liquid is brought to the desired temperature by any suitable form of heater and from such point it is directed in an entirely closed pipe to, and through, the body of the acid in the evaporator. We provide suitable means whereby the temperature of the heated medium can be observed, controlled and regulated, the object of this being to keep the temperature somewhat above the boiling point of the acid contained in the evaporator at that particular time.

The use in place of steam, as the heating medium, of a liquid having a higher boiling point than the acid at all stages of the process decreases very materially the pressure within the coil and thereby decreases the pressure difference between the inside and the outside of the coil, thus permitting the use of a thinner pipe-wall and decreasing the risk of bursting the pipe and prolonging its life. As steam of the requisite temperatures to serve in high condensations must be at very high pressure, the pressure within the coil, when steam is the heating medium, is excessively high, while owing to the high vacuum there is a negative pressure on the outside of the coil. This means that at the higher ranges of condensation, where steam is used, the obtaining of an acid proof material of sufficient strength to serve under the exacting conditions thus presented is a serious problem. The importance of the advantage secured by using such a heating medium is illustrated by the fact that it is possible, where oil is used as the heating medium, to employ so low an internal coil pressure as 15 pounds per square inch as against 250 pounds per square inch where, in condensing from 65° Bé. to 66° Bé. the heating medium is required to have a temperature of 510° F. This completely solves the problem, there being no difficulty in finding an acid proof material of sufficient strength to withstand the less rigorous conditions thus presented.

We refer from time to time in this specification and in the claims appended hereto to temperature control and by this we mean that we can and do control the temperature of the flowing column of oil which constitutes our heating medium; in this way and in this manner we can at all times apply just the right heat for vaporization at any particular time or at any special stage of the de-hydration; this is one of the important phases of our invention namely, the application and utilization of indirect heat under temperature control.

In combination with the indirect heat with temperature control we employ a high vacuum in our equipment condensing the vapors created in the evaporator without disturbing the vacuum.

It is the co-ordination of these various phases which renders our system and process highly effective: that is to say the combination of the indirect heating method under temperature control and maintaining simultaneously in the system a high vacuum by providing means for condensing and eliminating the created vapors in the manner stated the whole process being carried on in a closed system.

In order that the invention may be better understood we will proceed to describe it with reference to the accompanying drawing which forms a part of this specification.

In this drawing we present our newly engineered plan for carrying our process into effect wherein we take advantage of a high vacuum system, as has been stated, and in connection and combination therewith provide the indirect oil circulating heating system; a closed pipe being employed to convey the oil or other heating fluid through the central body of the acid.

At 10 we show an evaporator, or concentrator, of suitable size and dimensions and preferably disposed as shown of a height considerably greater than the width and made of acid proof metal. High silica iron has been known for many years as an acid proof but relatively brittle metal. It has also long been known that cast iron, though affected by strong acid, is relatively acid resistant. Refractory and acid resistant combinations of different materials were also known before the filing of this application and were and are available for acid proof purposes. The vessel 10 is cylindrical in shape and is intended for the reception of the acid which it is desired to concentrate and which acid is fed into it through the pipe 11 from the tank 12 a cock 13 being provided to regulate the flow; the tank 12 is employed to hold the acid which it is desired to bring to a further concentration; it can be of any size desired.

At 14 we show a closed pipe of acid proof material, as high silica iron, arranged in the lower half of the evaporator 10 and filled with hot flowing oil; this is the means and method we employ for providing indirect heat to vaporize the water content of the acid. Since oil may be heated to the required temperature without production of excessive pressure as in the case of steam, a higher degree of concentration may be readily produced without forcing failure of the pipe, i. e., exploding it, or requiring a strength of material in practice unobtainable. The acid proof material, high silica iron, of which it is preferred to make the pipe, is thus not subjected to any such destructive strain as would be placed on it by steam under sufficient pressure to attain the requisite temperature, and its relatively brittle character does not, therefore, unfit it for this service.

The pipe 14 is coiled and is so disposed as to come in contact with the central body of the acid the latter being indicated at 15 with a normal upper surface 16: one advantage of this arrangement for raising the temperature of the acid to the desired point is that it serves the principles of efficiency and economy of fuel cost to thus traverse the central body of the acid instead of attempting to heat the contents of the evaporator from the exterior; this is a cardinal point of our invention and one on which we lay great stress as it bears upon the commercial value and availability of our system.

This plan and arrangement is important for the reason that the acid proof metal of which we form our evaporator cannot be employed in contact with direct heat as it will crack at these high temperatures.

The coiled pipe 14 is, as stated, closed, that is to say without perforations, and that part of said pipe positioned inside of the evaporator 10 shown in the manner of a manifold forms an integral portion of a complete circulatory system the said pipe entering the evaporator at the point 17 and leaving it at the point 18. From the point 18 the oil in the pipe 14 with some of its heat extracted, as will be explained, is drawn out of the manifold of the pipe 14 positioned in the evaporator by the pump 19 and directed into the manifold of the same continuous pipe positioned in a suitable heater 20; the heat is generated by an oil burner 21 the products of combustion escaping at 22; however coal, wood, gas or any other fuel may be used; but the pipe 14 is closed throughout its whole extent and the oil therein while flowing through the manifold positioned in the heater 20 and remaining at low pressure as above explained is raised to the temperature desired; the pipe 14 enters the heater 20 at a point 23 and leaves at a point 24 and from the latter point it extends to the point 17 again, thus making a complete circuit. This circulation of the oil with ability to vary the rate of oil flow implies exact temperature control which, by observation of the temperature of inlet and outlet of oil as well as of the acid in the evaporator, may be coordinated in the process to attain the end sought. This is a further advantage over steam whose temperature depends on its pressure and which, even if returned to the same boiler, has lost its original character and must be reconverted into steam at an excessively high pressure. A cock 25 is provided to regulate the flow of the oil through the pump 19 and a similar cock 26 is provided to regulate the flow of the oil into the manifold positioned in the evaporator. In lieu of the simple closed pipe 14 as shown we may employ a radiator, jacket, or container properly positioned in respect to the evaporator through which the continuously flowing oil can be directed; but it is to be understood that this element, that is, the pipe 14, or its mechanical equivalent, as aforesaid is closed throughout its whole extent as a perforated pipe would defeat the object and utility of our invention as it would interfere with, and disturb, the proper and efficient operation of the vacuum which we create in the evaporation.

In other words it is one of the objects of our invention to maintain in this new concentration or de-hydrating system a high vacuum and in order to do this we provide means for condensing and eliminating the vapors created in the evaporator without in any manner disturbing the vacuum.

At 27 is a pipe which connects with the upper part of the evaporator 10 at a point 28 and the jet condenser is shown at 29 and a water pipe at 30 having a flow control cock at 31; the pipe 32 leading from the condenser 29 discharges into an overflow waste vat at 33. The use of a barometric or siphon type condenser without the use of a vacuum pump is a material practical assistance in carrying out the process.

At 34 is a pipe opening out from the lower end of the evaporator 10 through which the de-hydrated or concentrated acid flows, the extent of its flow being governed by the cock 35. A pump 36 is provided to facilitate its flow if desired. A pipe 37 conveys the concentrated acid into any desired receptacle.

As before stated we provide means for observing, regulating and exactly controlling the temperature in our system; to these ends we place a thermometer 38 on the pipe 14 at a place where we can observe the temperature of the oil just as it leaves the heating chamber and at 39 we place a second thermometer by means of which we may ascertain the temperature of the acid in the evaporator. At 40 and 41 we place vacuum gauges. We measure the degrees Baumé of the acid 15 by the thermometer reading and the vacuum gauge reading.

At 42 we show the valve for regulating the flame of the oil burner and in this way the temperature in the heating chamber 20.

By means of the foregoing instrumentalities we establish and are able to maintain what we term herein a temperature control so that the temperature of the flowing oil can be kept above that of the acid at any particular time.

To review the operation of the system:

When it is desired to de-hydrate, or bring the acid contained in the vessel 12 to a higher degree of concentration, the cock 13 is opened and the acid is permitted to flow into the evaporator 10; preferably the acid is brought approximately to the level 16 in the evaporator. The cock 35 controlling the outflow is, for the time being, closed; the heater 20 is now set in operation the temperature being generated sufficiently high so as to heat the oil in the manifold to a degree whereby, when it enters the evaporator at the point 17, reaching said point through the continuous pipe 14, it will possess a temperature substantially higher than the boiling point of the acid contained in the evaporator at that particular time, that is to say that particular stage of concentration; and to illustrate the idea approximately we will state that such temperature may be in the neighborhood of 500° F. more or less, subject of course as aforesaid to conditions of the moment.

These are the factors which should govern the temperature of the ingoing oil; that is to say the temperature of the oil as it flows through the pipe 14 past the cock 26 into the evaporator 10.

While the hot oil is flowing through the manifold positioned in the evaporator it will part with certain units of heat which heat will pass into the surrounding body of acid and cause the water contained therein to vaporize; this vaporization is assisted by the high vacuum in the upper part of the evaporator and this is brought about as follows:

When the oil has been brought to the proper temperature and the evaporator has been partially filled with acid to be de-hydrated, or concentrated, the pump 19 is set in operation and the cocks 25 and 26 are opened to the desired degree; at the same time the cock 31 in the condenser system is opened permitting a flow of water through the jet condenser 29 thereby drawing the gaseous contents of the pipe 27 out and through the condenser and down the pipe 32. This operation will cause a high vacuum in the upper part of the evaporator 10 and will result in a substantially lower boiling point of the acid in the evaporator. It will thus be seen that the sulphuric acid being subjected to less heat, the boiling occurring at a much lower temperature than at atmospheric pressure, the very objectionable breaking up of the acid into its components $H_2O$, $SO_2$ and $SO_3$ will be largely, if not wholly, avoided, and a direct and serious loss of acid, practically nonrecoverable, thereby eliminated, and escape of offensive fumes to the atmosphere prevented. The boiling point is lowered the more, the higher the vacuum, and operation at a high vacuum is thus a desideratum particularly during high condensations. A high vacuum, a heating medium at low pressure, with decreased pressure difference between the inside and the outside of the conveying coil, and at a temperature only a little higher than that necessary at any given time to produce evaporation, with the exact control requisite to these ends is characteristic of our process.

The oil is maintained at a temperature of approximately 500° F. ingoing and approximately 450° F. outgoing. The heat of the oil in the closed pipe 14, operating in conjunction with the vacuum will cause the vaporization of the water content of the acid at a temperature of approximately from 400° F. to 350° F.

It will be seen from the foregoing that we have embodied in a single system the application of a continuously flowing stream of hot fluid in a closed pipe through the mass or body of the dilute acid supplying indirect heat thereto and causing the vaporization of the water content and in combination with this and in simultaneous operation have provided a high vacuum system and that we provide means in our vacuum system for condensing and eliminating the vapors created in the evaporator without impairing the vacuum or disturbing it in any way.

We have also shown in our system that we can and do control the temperature of the flowing oil and keep it at a point where it is somewhat higher than the temperature of the acid at that particular time or stage of dehydration.

At 43 we show an expansion tank in the pipe 14.

Having thus described our invention the following is what we claim as new and useful therein and desire to secure by Letters Patent.

1. The process of concentrating sulphuric acid under vacuum, which consists in subjecting the acid to be concentrated to the action of a liquid heating medium flowing through but separated from the acid and which has at all stages of the process a higher boiling temperature than the acid, heating said medium to different degrees to so vary its temperature from time to time as to insure vaporizing of water in the acid under the particular conditions of acid concentration and vacuum prevailing at any given time, and subjecting the acid undergoing said treatment to a vacuum.

2. The process herein described of concentrating sulphuric acid which consists in subjecting the confined acid to the indirect heating action of a column of oil continuously flowing through but separated from the acid, maintaining said oil at a temperature of approximately 500° F. ingoing, and approximately 450° F. outgoing, creating and maintaining a vacuum to which the acid is subjected, and which is sufficiently high to cause vaporization of the water content of the acid at temperatures between approximately 350° F. and 400° F. and drawing off the concentrated acid.

3. The process of producing the commercial 66° Bé. grade of sulphuric acid, which consists in indirectly heating dilute acid confined under high vacuum, by endlessly circulating through but separate from the acid a liquid having at all stages of the process a higher boiling point than that of the acid at the corresponding stage, heating said liquid above the boiling point of said acid but below its own, and maintaining the vacuum at such degree that the temperature of the acid is about 100° below the temperature of the heating liquid.

WALTER H. SIMONSON.
OTTO MANTIUS.